United States Patent
Gast et al.

(10) Patent No.: US 10,065,597 B2
(45) Date of Patent: Sep. 4, 2018

(54) SELF-ADJUSTING SAFETY BELT SYSTEM FOR OCCUPANTS OF VARYING SIZES

(71) Applicant: GHC, SL, Andorra la Vella (AD)

(72) Inventors: Theodore August Gast, El Tarter (AD); Claudia Capella Masero, El Tarter (AD); Luis Capella Folguera, Barcelona (ES); Carlos Grassi Osma, Barcelona (ES)

(73) Assignee: GHC, SL, Andorra la Vella (AD)

( * ) Notice: Subject to any disclaimer, the term of this patent is extended or adjusted under 35 U.S.C. 154(b) by 0 days.

(21) Appl. No.: 15/202,537

(22) Filed: Jul. 5, 2016

(65) Prior Publication Data
US 2018/0009409 A1    Jan. 11, 2018

(51) Int. Cl.
  *B60R 22/20*    (2006.01)
  *B60R 22/36*    (2006.01)
  *B60R 22/10*    (2006.01)
  *B60R 22/34*    (2006.01)

(52) U.S. Cl.
  CPC .......... *B60R 22/201* (2013.01); *B60R 22/105* (2013.01); *B60R 22/36* (2013.01); *B60R 2022/3427* (2013.01)

(58) Field of Classification Search
  CPC ..... B60R 22/201; B60R 22/36; B60R 22/105; B60R 2022/3427
  See application file for complete search history.

(56) References Cited

U.S. PATENT DOCUMENTS

| 3,810,657 | A | * | 5/1974  | Campbell | B60R 22/022 280/808 |
| 4,880,254 | A | * | 11/1989 | Muller   | B60R 22/202 280/801.2 |
| 4,949,994 | A | * | 8/1990  | Zawisa   | B60R 22/20 248/292.14 |
| 5,358,310 | A | * | 10/1994 | Nemoto   | B60R 22/023 297/473 |
| 5,609,367 | A |   | 3/1997  | Eusebi   |  |
| 5,733,013 | A | * | 3/1998  | Brown    | B60R 22/26 280/808 |

(Continued)

FOREIGN PATENT DOCUMENTS

EP    1731385 B8    10/2008
EP    2743127 A1    6/2014

*Primary Examiner* — Darlene P Condra
(74) *Attorney, Agent, or Firm* — Adam Bagwell; Bagwell IP (57) ABSTRACT

A multi-point seat belt safety apparatus and system and device that automatically moves, adjusts, or otherwise corrects itself around one or more webbing deflection points, and utilizes different components, to accommodate seat occupants with different sizes and ages. In particular, when an occupant extends the webbing across their torso towards an anchor point, generally disposed to the near the side of their waist, the webbing first contacts the torso/shoulder of the occupant at a particular distance above the seat, which is reflective of the occupant's height, causing the webbing to automatically move along a length of a deflection element, positioned at, above, or near the shoulder of the seat occupant, to an appropriate deflection point. At such, the webbing is kept at a proper location, away from the neck of the occupant.

19 Claims, 9 Drawing Sheets

(56) References Cited

U.S. PATENT DOCUMENTS

| | | | |
|---|---|---|---|
| 6,669,302 B2* | 12/2003 | Warner, Jr. | B60N 2/2803 |
| | | | 297/250.1 |
| 6,846,020 B2 | 1/2005 | Xu | |
| 8,480,180 B2 | 7/2013 | Titz | |
| 9,321,428 B2 | 4/2016 | Carbone | |
| 2003/0197363 A1* | 10/2003 | Volk | B60R 22/023 |
| | | | 280/802 |
| 2005/0127660 A1 | 6/2005 | Liu | |
| 2008/0100051 A1 | 5/2008 | Bell | |
| 2010/0181750 A1* | 7/2010 | Fukuzawa | B60R 22/24 |
| | | | 280/801.2 |
| 2012/0119479 A1* | 5/2012 | Parker | B60N 2/2809 |
| | | | 280/807 |
| 2013/0327874 A1* | 12/2013 | Jessup | B60R 22/34 |
| | | | 242/379 |
| 2014/0217787 A1* | 8/2014 | Fukuzawa | B60R 22/1952 |
| | | | 297/216.1 |
| 2014/0303851 A1* | 10/2014 | Nagasawa, Sr. | |
| | | | B60R 21/01544 |
| | | | 701/45 |

* cited by examiner

SELF-ADJUSTING SAFETY BELT SYSTEM FOR OCCUPANTS OF VARYING SIZES

BACKGROUND

Prior to 1968, vehicle safety belts were generally considered to be optional equipment, meaning that a consumer would either have to order a vehicle with safety belts installed or attempt to locate a vehicle at a dealership that included safety belts. However, on Jan. 1, 1968, United States federal law required that all vehicles (except buses) be fitted with safety belts in all designated seating positions (Title 49 of the United States Code, Chapter 301, Motor Vehicle Safety Standard). Since that date, most states have passed laws regarding required safety belt (alternately referred to throughout as a seat belt) usage for children and/or different size adults. Additionally, federal law now requires certain passenger buses to have seat belt assemblies whose lap belt assembly can be used to tightly secure a child restraint system. Since passage of these laws, prior methods and systems are still being utilized with the same essential components in essentially the same configuration, even though those configurations are not always functional, safe, and comfortable for seat occupants of varying size, height, and age. There currently does not exist a seat belt system that successfully and automatically secures people of varying ages and sizes.

Prior methods and systems utilized in multi-point seat belt systems, e.g., 3-point seat belts, place a belt retractor in proximity to the seat, either fixed to the vehicle or to the seat at a point below the occupant or in the bottom of the seat. These methods and systems additionally utilize a fixed pillar loop or D-ring element near the seat occupant's shoulder as an anchor point for the seat belt (webbing) extending from the belt retractor. The belt additionally passes through a standard tongue shaped metal plate ("metal tongue") (typically an element that moves freely along the webbing) and is fixed at its end to a point at or near the seat bottom, i.e., a first lower anchor point. To secure the occupant, the webbing diagonally passes across the upper torso of the occupant and across the lower portion of the occupant, with the metal tongue being inserted into a locking device that retains the metal tongue (until the occupant presses a release mechanism), creating a second lower anchor point. Due to the fixed nature and location of these anchor points, prior methods and systems do not allow for easy repositioning of the webbing/shoulder belt across the shoulder and upper torso of an occupant. In other words, the prior methods and systems often utilize the same webbing/belt positioning for both a larger adult and a small child. For those methods and systems that permit adjustment, those adjustments must be accomplished manually via height adjusters which are attaching to the vehicle or an edge of the seat. However, if a younger seat occupant (or a parent or caregiver of the younger seat occupant) fails to manually adjust the height properly, the seat belt may present a grave danger to the seat occupant in the event of a vehicle accident, as the belt may pass too close to their neck.

In the prior 3-point systems, the D-ring are sometimes attached to a vertical height adjuster, which is fastened or otherwise secured to the vehicle at point far above an adult's shoulder. As noted above, this placement may prove fatal for children or smaller adults, e.g., the belt passes too close to their neck. For example, U.S. Pat. No. 5,609,367 utilizes a second D-ring/pillar loop/webbing guide connected to a height adjuster, below a first D-ring, allowing the repositioning of the shoulder belt across the upper torso of the occupant. Since the height of the second webbing guide has to be manually adjusted, which results in potential danger to smaller seat occupants as noted above. U.S. Pat. No. 6,846,020 describes two webbing deflection points, both fastened to the seat. Both deflection points are fixed within the seat, requiring them to be manually adjusted or moved. As noted above, the manual nature of these adjustments presents a grave danger to smaller seat occupants. Additionally, the described configuration creates a substantial amount of friction on the webbing.

In the prior 3-point systems, a standard metal tongue is used that moves freely along the webbing, which is then inserted into a locking device. A 3-point seat belt system with this metal tongue does not allow for the lap belt section of a prior seat belt assembly to tightly secure a child restraint system, which is now required by federal law for certain newly manufactured passenger buses. New seat belt systems have been designed to satisfy this law, but these systems utilize a unique retractor that is not only more expensive, but also larger and therefore hard to fit in the seat back without making the seat back wider, which often reduces the number of seat rows that fit in the bus. These retractors switch to a locking mode by pulling all of the webbing out of the retractor, which is not always understood by occupants. Additionally, due to their larger size, they must be placed in the bottom of the seat or outside of the seat, creating a longer webbing path and adding significant friction to the seat belt system. This significant friction makes the seat belt tough to use, and requires a stronger spring in the retractor to overcome the friction, creating higher retraction forces and therefore significant pressure on the occupant's chest and discouraging the use of the seat belt due to discomfort. When oversized adults use the prior 3-point systems, often there is not enough webbing in the retractor to secure them. Even high capacity retractors designed to hold more webbing for larger adults are larger and often do not fit in the seat back, especially in the top part of the seat back where it is most desired to have a narrow profile. Placing the large retractor at the bottom of the seat or below the occupant, adds significant friction, making the seat belt tough to use, and requires a stronger spring in the retractor to overcome the friction, creating higher retraction forces and therefore significant pressure on the occupant's chest and discouraging the use of the seat belt due to discomfort.

Despite advances in technology and regulations, current 3-point seat belt safety systems still fail to properly fit and protect variously-sized seat occupants automatically. For smaller seat occupants, including children, at best, modern technology introduced additional, manual steps that, if not followed every time, presents a greater danger to the seat occupant. For younger children requiring child safety restraints, prior 3-point safety belt designs cannot properly secure child safety restraints in buses, and existing 3-point seat belts cannot reasonably be adapted to do so. For very large adults, current safety belts often do not have enough webbing capacity, even with high-capacity retractors.

SUMMARY

The following presents a simplified summary in order to provide a basic understanding of some aspects of the invention. This summary is not an extensive overview. It is not intended to identify key or critical elements of the invention or to delineate the scope of the invention. The following summary merely presents some concepts of the invention in a simplified form as a prelude to the more detailed description provided below.

Aspects of the present invention increase the safety and comfort of different sized occupants by, among other things, self-adjusting the relative positioning of the shoulder belt to lay across the upper torso for different size occupants (e.g., adult vs. child) and reducing friction in the seat belt system by reducing the length of webbing travel and strategically positioning the retractor and two deflection points.

Aspects of the present invention include an exemplary safety system for an occupant in a seat, with the seat having a seat back, with the seat back having a front side and a rear side, and the seat having at least two lower anchor points, each of the at least two anchor points being located on opposite sides of the seat from the other. The system includes, among other things, a webbing operative for extending longitudinally across a torso of the occupant of the seat and a retractor operative for supplying the webbing, maintaining tension on the webbing, and retracting the webbing. The system further includes a first deflection element for deflecting the webbing from the retractor at a first deflection point, a second deflection element for the webbing deflected from the first deflection element, with the second deflection element having a length along which the webbing deflects at a second deflection point towards the front side of the seat back and towards one of the at least two anchor points. According to aspects of the present invention, the second deflection point occurs at a variable position along the length of the second deflection element, such that the second deflection point reflects a height of the occupant.

According to other aspects, elements of a safety system an occupant in a seat are described, with the seat having a seat back, with the seat back having a front side and a rear side, and the seat having at least two lower anchor points, each of the at least two anchor points being located on opposite sides of the seat from the other. The system includes, among other things, a webbing operative for extending longitudinally across a torso of the occupant of the seat, a retractor operative for supplying the webbing, maintaining tension on the webbing, and retracting the webbing. The system further includes, among other things, a first tongue-shaped metal plate that is inserted into a locking device at the lower anchor point on the side of the seat opposite a deflection element, and a lap belt section that can be lockable in order to secure a child restraint system.

According to other aspects, elements of a safety system an occupant in a seat are described, with the seat having a seat back, with the seat back having a front side and a rear side, and the seat having at least two lower anchor points, each of the at least two anchor points being located on opposite sides of the seat from the other. The system includes, among other things, a webbing operative for extending longitudinally across a torso of the occupant of the seat, with the webbing having a first end and a second end and a first retractor and a second retractor, with the first retractor and the second retractor being operative for supplying the webbing, maintaining tension on the webbing, and retracting the webbing. According to aspects of the present invention, the first retractor is positioned at the first end of the webbing and the second retractor is positioned at the second end of the webbing.

Aspects of the present invention may advantageously utilize two retractors within an exemplary seat belt system, offering significantly more webbing than a single high-capacity retractor, thereby providing proper securement for very large adults. Using two retractors, one at each end of the webbing (e.g., one mounted in the seat back and one mounted below the occupant), an exemplary system offers almost twice the webbing capacity. By using two retractors to gain additional webbing, each individual retractor placed in the seat back may be shorter and smaller, allowing for a narrower seat back profile. Additionally, placing a smaller retractor in the upper half of the seat back shortens the webbing path, which allows for a low-friction solution and a better performing seat belt system.

BRIEF DESCRIPTION OF THE DRAWINGS

A more complete understanding of aspects of the present invention and the advantages thereof may be acquired by referring to the following description in consideration of the accompanying drawings, in which like reference numbers indicate like features, and wherein:

FIG. 5A illustrates an exemplary system utilizing an exemplary adjustable metal tongue along the exemplary webbing, while

DETAILED DESCRIPTION

In the following description of the various embodiments, reference is made to the accompanying drawings, which form a part hereof, and in which is shown by way of illustration various embodiments in which features may be practiced. It is to be understood that other embodiments may be utilized and structural and functional modifications may be made.

Figure 1:
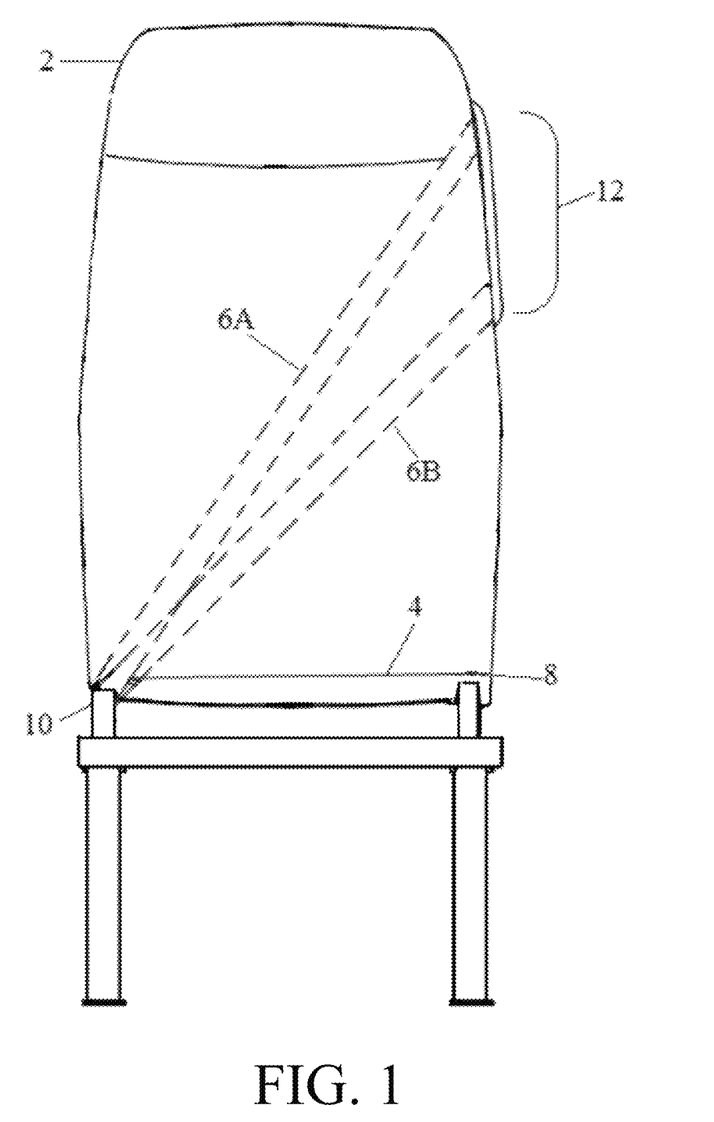
FIG. 1 illustrates a diagram of a front view of an exemplary seat belt safety system, with the webbing shown in two exemplary positions, according to various aspects described herein.

Aspects of the present invention provide, among other things, a seat belt safety system, apparatuses, and devices, as illustrated in FIG. 1. In FIG. 1, an exemplary front view of a seat 2 is shown with a webbing 4 positioned transversely across a lower portion of the seat 2, extending from a first lower anchor point 8 to a second lower anchor point 10. The webbing 4 then proceeds diagonally upwards toward deflection element 12. As demonstrated in FIG. 1, the webbing 4 may contact deflection element 12 towards the upper end of its length (as illustrated at 6A) or towards the bottom end of its length (as illustrated at 6B), or at any appropriate portion along its length. As noted below, the portion of the length of the deflection element 12 contacted by the webbing 4 is determined based on the relative positioning of elements and the height or size of a seat occupant, as described below with respect to the exemplary rear views demonstrated in FIGS.

2A, 2B, 3A, 3B, 4A, and 4B. By way of demonstration and not limitation, deflection element 12 may comprise or otherwise include an opening in or on the seat through which the webbing 4 may pass without undue friction. According to aspects of the present invention, deflection element 12 acts as an entry slide and provides entry angles that are generally oriented to allow easy travel of webbing 4 and provides sufficient clearance to allow movement of the webbing 4 without unnecessary friction between the opening and the webbing 4. For example, deflection element 12 may include, among other things, a plastic form with a void or slot which permits webbing 4 to pass through the seat 2 with little friction and at different heights while being redirected around the occupant's upper torso. Element 12 may optionally utilize, by way of demonstration and not limitation, a metal or plastic rod, rotating or otherwise, with a suitable radius and smooth surface to redirect the webbing. Any suitable radius and/or smooth surface may be utilized that reduces the friction around deflection element 12, which not only increases comfort of the occupant but also increases the safety of the occupant by better distributing forces experienced during deceleration events.

Figure 2A:
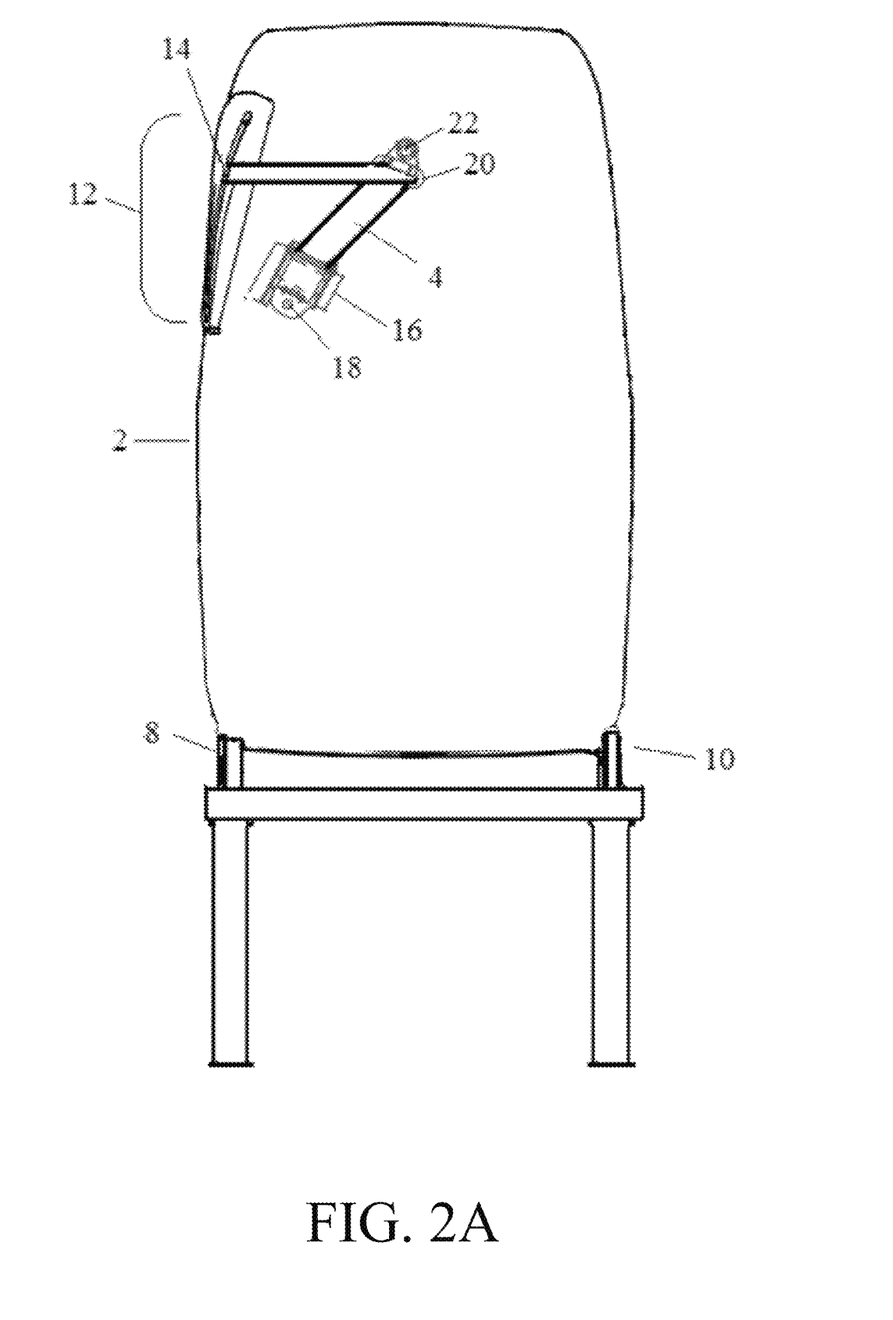
FIGS. 2A and 2B illustrate rear views of a seat of an exemplary seat belt safety system, demonstrating exemplary positioning of webbing for an exemplary "adult setting" and "child setting", respectively, and exemplary relative positioning of various elements according to various aspects described herein.

By way of demonstration and not limitation, FIG. 2A illustrates an exemplary rear view of seat 2 with webbing 4 in position 6A, with webbing 4 contacting deflection element 12 at deflection point 14, referred to herein as an "adult setting". While referred to as an "adult setting", it should be understood that this setting is generally reflective of a taller seat occupant (not shown), as compared to an average height of a toddler or a child of elementary school age. As such, an adult of shorter stature may need a webbing position closer to that of 6B, or at some other position along the length of deflection element 12. In the example shown in FIG. 2A, a retractor 16 is located on the upper part of the seat 2. Retractor 16 may be attached in any manner or means that furthers the objective of the various aspects of the present invention. For example, retractor 16 may be fixed into position by appropriate fasteners, adhesive, or may otherwise be constructed into the seat. According to aspects of the present invention, retractor 16 may be movable fixed at 18, such that retractor 16 may rotate or otherwise swivel about or around 18. Any appropriate means of attachment may be utilized without departing from the scope of the present invention. It should be understood that different locations for element 16 may be utilized without departing from the scope of the present invention. The webbing 4 then extends diagonally upwards from retractor 16, passes through a first deflection element 20, and extends towards, through, or around (or some combination thereof) deflection point 14. Deflection element 20 is located in the middle top of the seat, at approximately the same level as the highest point of deflection element 12. Deflection element 20 may comprise or otherwise include any appropriate structure that enables the "deflection" of webbing 4 from retractor 16 to deflection element 12. As shown in FIG. 2A, deflection element 20 may be movably fixed at or around 22 by any appropriate manner or means. Different locations for element 20 may be utilized without departing from the scope of the present invention. In this example, along the vertical plane, and around an axis perpendicular to the seat back, retractor 16 is placed at an angle between 30 degrees to 90 degrees for a right-hand seat (webbing exits the seat on the right-hand side), or between 90 degrees and 150 degrees for a left-hand seat (webbing exits the seat on the left-hand side). These angles illustrated in this example advantageously allow the webbing (with the help of element 20) to self-adjust to a resting position at a lower point along element 12, closer to that of 6B. In this manner, the seat belt is ready to secure a child without any manual adjustment. When a larger or taller adult occupies the seat and wears the seat belt, these angles allow the webbing (with the help of element 20), to self-adjust to a higher position along element 12, closer to that of 6A.

Figure 2B:
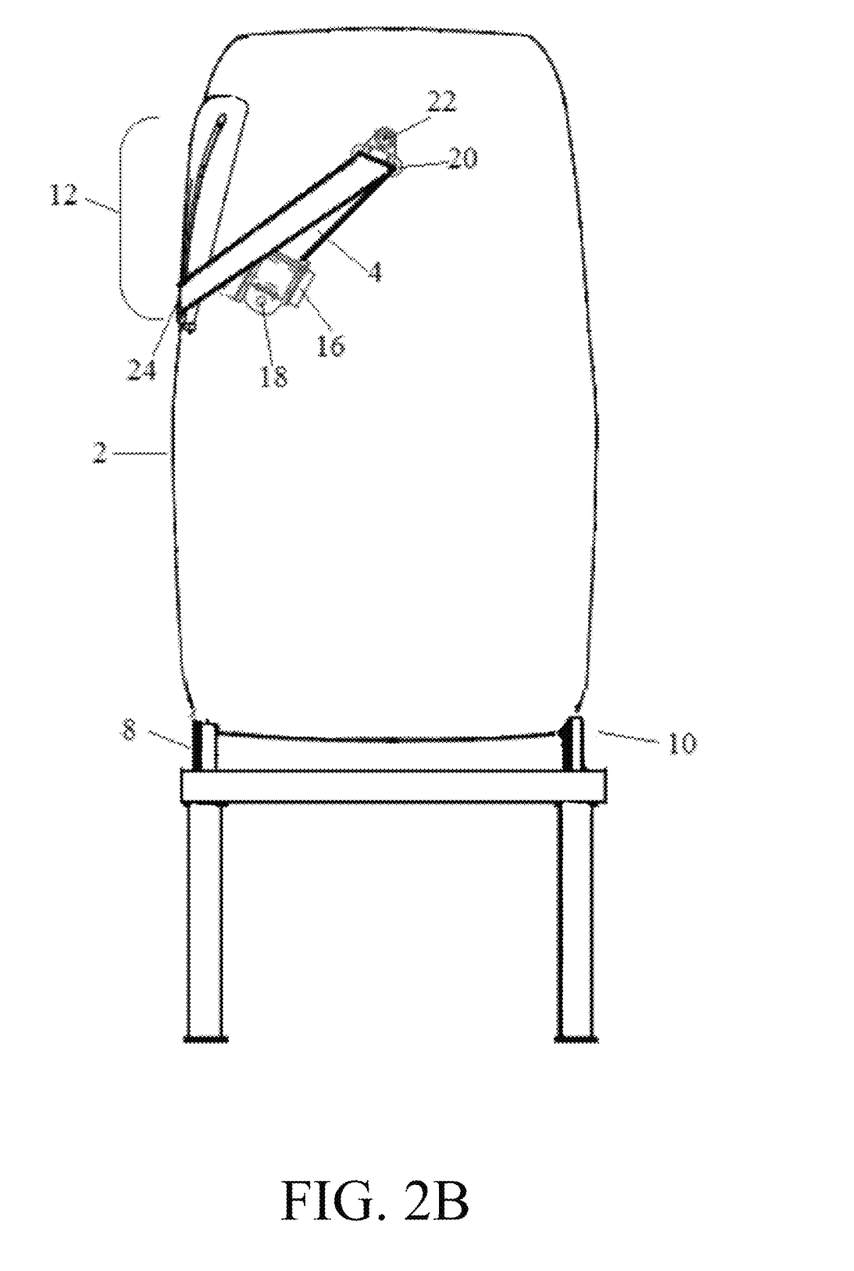

FIG. 2B illustrates an exemplary rear view of seat 2 with webbing 4 in position 6B, with webbing 4 contacting deflection element 12 at deflection point 24, referred to herein as an "child setting". While referred to as an "child setting", it should be understood that this setting is generally reflective of a smaller seat occupant (not shown), as compared to an average height of an adult. As such, a child of a larger stature may need a webbing position closer to that of 6A, or at some other position along the length of deflection element 12. In operation, the relative configuration or placement of elements, such as those demonstrated in FIGS. 2A and 2B, allow a seat occupant to quickly utilize the seat belt safety system in a manner suitable for their size. For example, when an occupant occupies seat 2 in FIG. 1, an occupant passes the belt 4 across their torso from their left to right, securing a deflection element (not shown) into lower anchor point 10. The webbing generally moves into the appropriate position, e.g., 6A, 6B, or other positions not illustrated, at the appropriate deflection point, e.g., deflection points 14, 24, or other deflection points not illustrated, based on the height of the individual. This movement is generally accomplished based on contact with the upper torso/shoulder of the seat occupant when webbing 4 is pulled to engage the seat belt system, e.g., torso/shoulder contact at greater height when engaging the seat belt system results in the belt remaining at a higher position 6A and deflection point 14, and torso/shoulder contact at a lower height results in the belt settling into position 6B and deflection point 24, or at some other appropriate position along deflection element 12. It should be noted that, while FIGS. 2A and 2B illustrate configurations whereby webbing 4 deflects to the front of seat 2 on the left side of seat 2, these configurations may be oriented in a mirror-image fashion, such that the webbing 4 deflects to the front of seat 2 on the right side of seat 2, without departing from the scope of the present invention. As should be evident, this also applies to FIGS. 3A-4B, as described below.

Figure 3A:
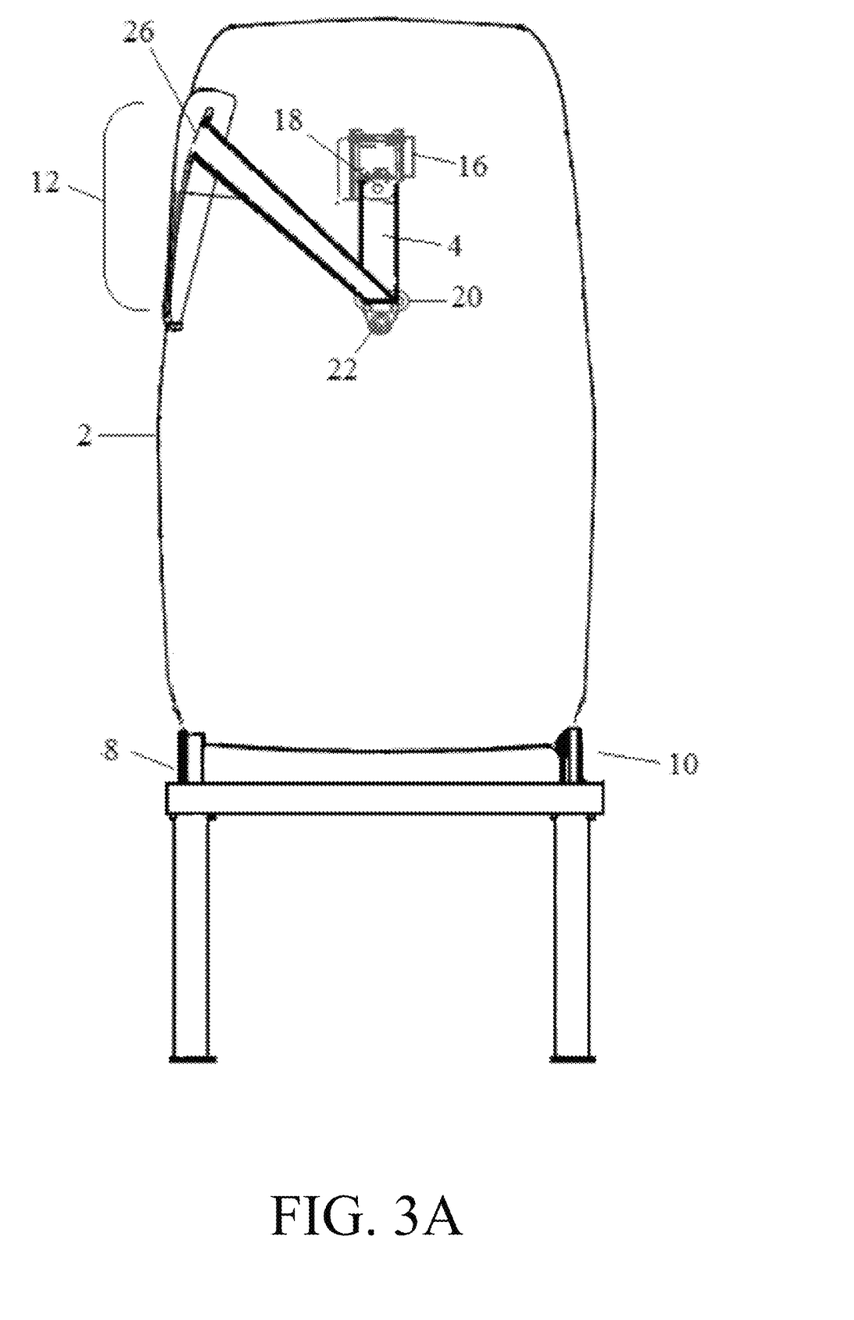
FIGS. 3A and 3B illustrate rear views of a seat of an exemplary seat belt safety system, demonstrating exemplary positioning of webbing for an exemplary "adult setting" and "child setting", respectively, and exemplary relative positioning of various elements according to various aspects described herein.
Figure 3B:
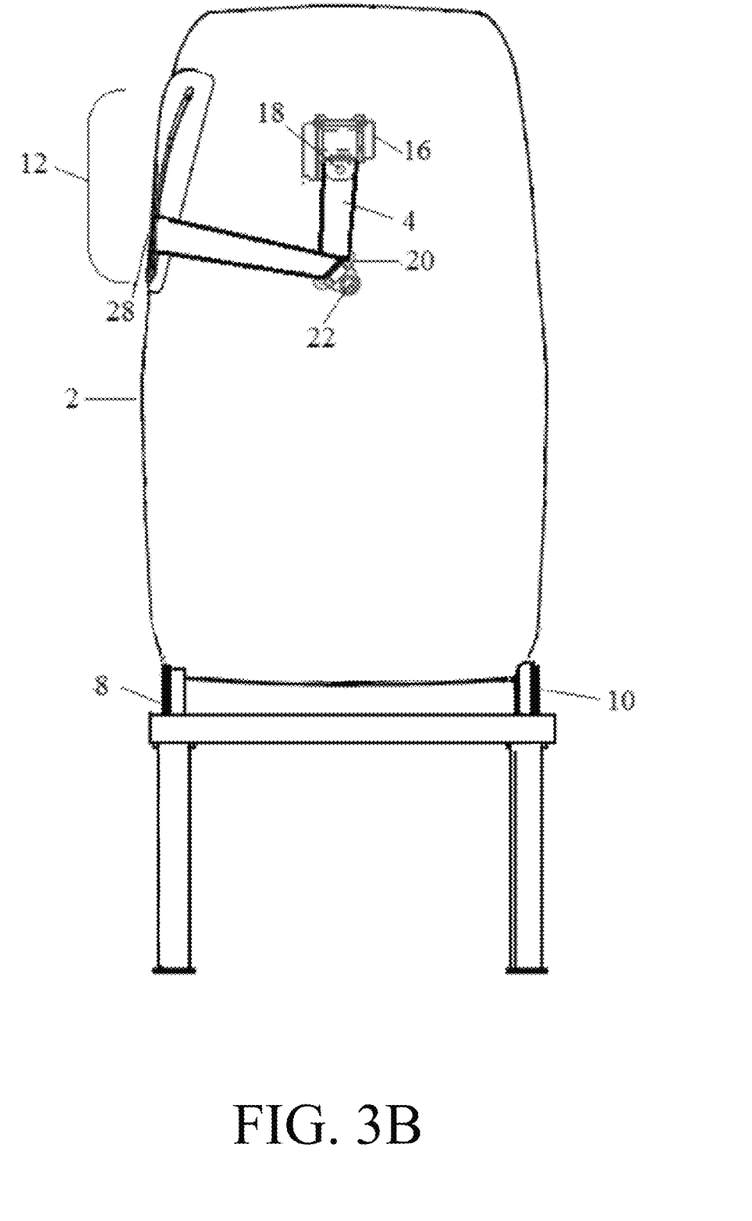

FIG. 3A illustrates another example of relative positioning of seat belt elements according to aspects of the present invention. In the example in FIG. 3A, retractor 16 is positioned above deflection element 20, such that webbing 4 extends downward from retractor 16, through deflection element 20, and then contacting deflection element 12 at deflection point 26, e.g., an "adult setting" similar to 6A in FIG. 1. In this exemplary configuration, deflection element 20 is oriented such that the downward extending portion of webbing 4 remains substantially parallel to a longitudinal axis of the back of seat 2. A "child setting" example (similar to 6B in FIG. 1) is illustrated in FIG. 3B, where the webbing 4 extends downward from retractor 16, through deflection element 20, and then contacting deflection element 12 at deflection point 28. Like the examples in FIGS. 2A and 2B above, other deflection points along the length of deflection element 12 are clearly within the scope of the present invention. As noted above, different locations for element 16 and element 20 may be utilized without departing from the scope of the present invention. The webbing generally moves into the appropriate position and appropriate deflection point as described above with respect to FIGS. 2A and 2B, such that deflection element 20 rotates to ensure proper deflection point and webbing placement based on the height of the seat occupant. The example in FIGS. 3A and 3B advantageously allows for an assembly cost reduction, as the same seat structure may be utilized for both left- and right-type seats.

Figure 4A:
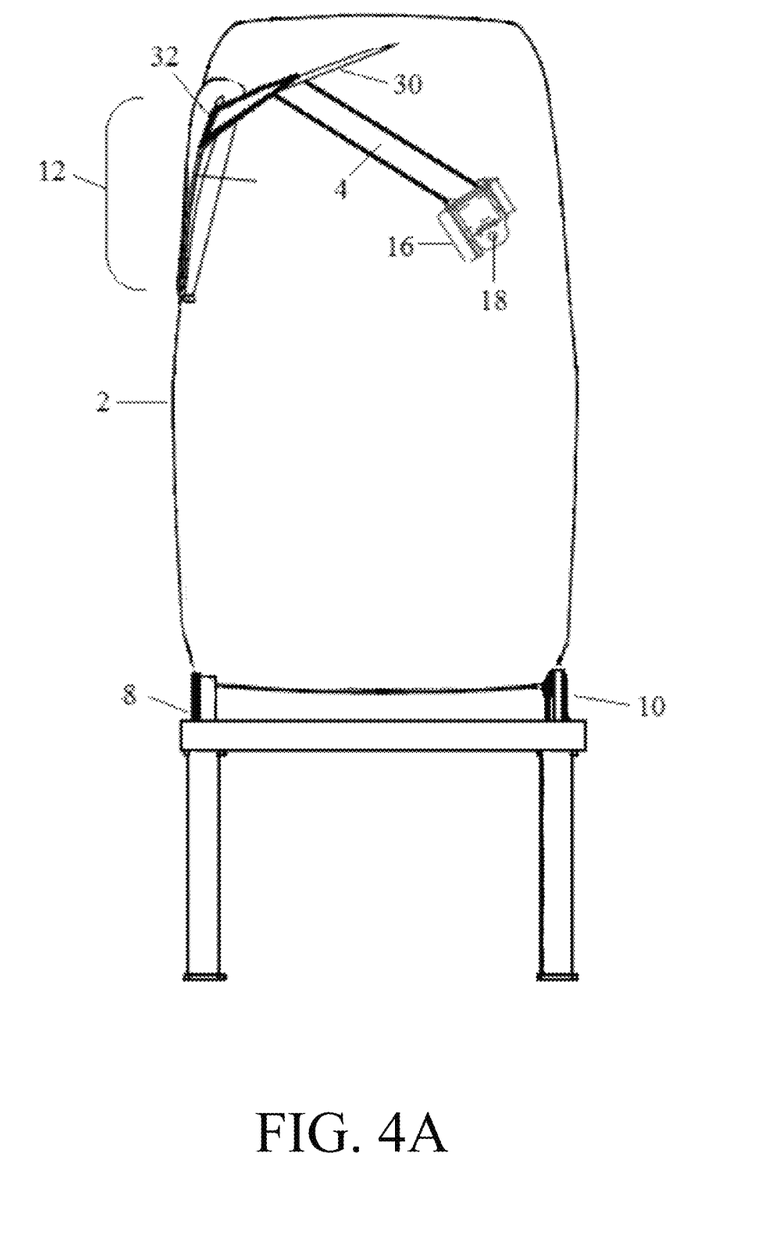
FIGS. 4A and 4B illustrate rear views of a seat of an exemplary seat belt safety system, demonstrating exemplary positioning of webbing for an exemplary "adult setting" and "child setting", respectively, and exemplary relative positioning of various elements according to various aspects described herein.
Figure 4B:
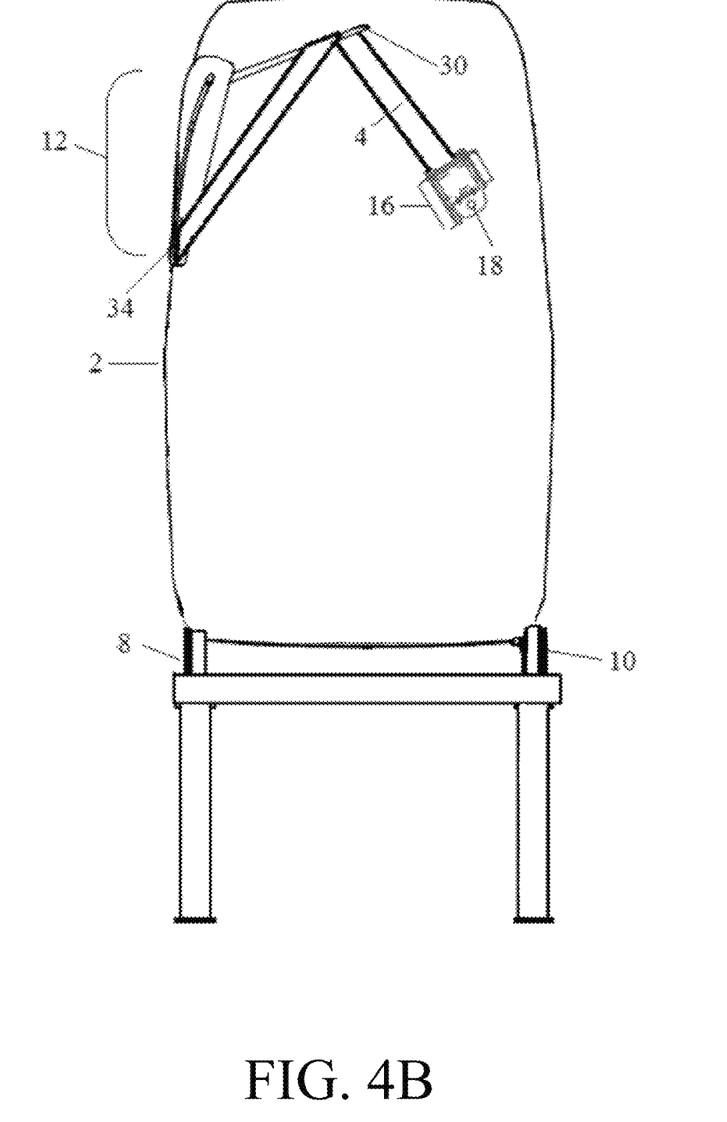

FIG. 4A illustrates another example of relative positioning of seat belt elements according to aspects of the present invention. In the example in FIG. 4A, retractor 16 is positioned below deflection element 30 and on the side of the seat 2 opposite of deflection element 12, such that webbing 4 extends diagonally upwards from retractor 16, around deflection element 30, and then contacting deflection element 12 at deflection point 32, e.g., an "adult setting" similar to 6A in FIG. 1. While deflection element 30 is depicted as a cylindrical structure, such as a bar or rod, other appropriate structure(s) may be utilized that allows webbing 4 to pass, slide, move, or otherwise position itself along the length of the structure with minimal resistance. In this exemplary configuration, deflection element 30 is positioned with a first end towards the top of seat 2 and a second end positioned at a lower point towards a side of the seat 2. Advantageously, this deflection element positioning allows webbing 4 to slide along and around deflection element 30 in a manner reflecting the height of the seat occupant, e.g., in FIG. 4A, the exemplary "adult setting" permits webbing 4 to deflect around deflection element 30 at a point closer to the lower end, which tends to keep webbing 4 positioned higher on the front of seat 2. A "child setting" example (similar to 6B in FIG. 1) is illustrated in FIG. 4B, where the webbing 4 extends diagonally upwards from retractor 16, around deflection element 30, and then contacting deflection element 12 at deflection point 34. Advantageously, the positioning of deflection element 30 allows webbing 4 to slide along and around deflection element 30 in a manner reflecting the height of the seat occupant, e.g., in FIG. 4B, the exemplary "child setting" permits webbing 4 to deflect around deflection element 30 closer to the higher end of deflection element 30, which tends to keep webbing 4 positioned lower on the front of seat 2. Like the examples in FIGS. 2A-3B above, other deflection points along the length of deflection element 12 are clearly within the scope of the present invention. The webbing generally moves into an appropriate position and appropriate deflection point in a manner similar to that described above with respect to FIGS. 2A-3B.

While FIGS. 4A and 4B illustrate a deflection element 30 with its first end positioned higher than its second end, it is within the scope of the present invention to position deflection element 30 in a substantially horizontal position without departing from the scope of the present invention.

Figure 5A:
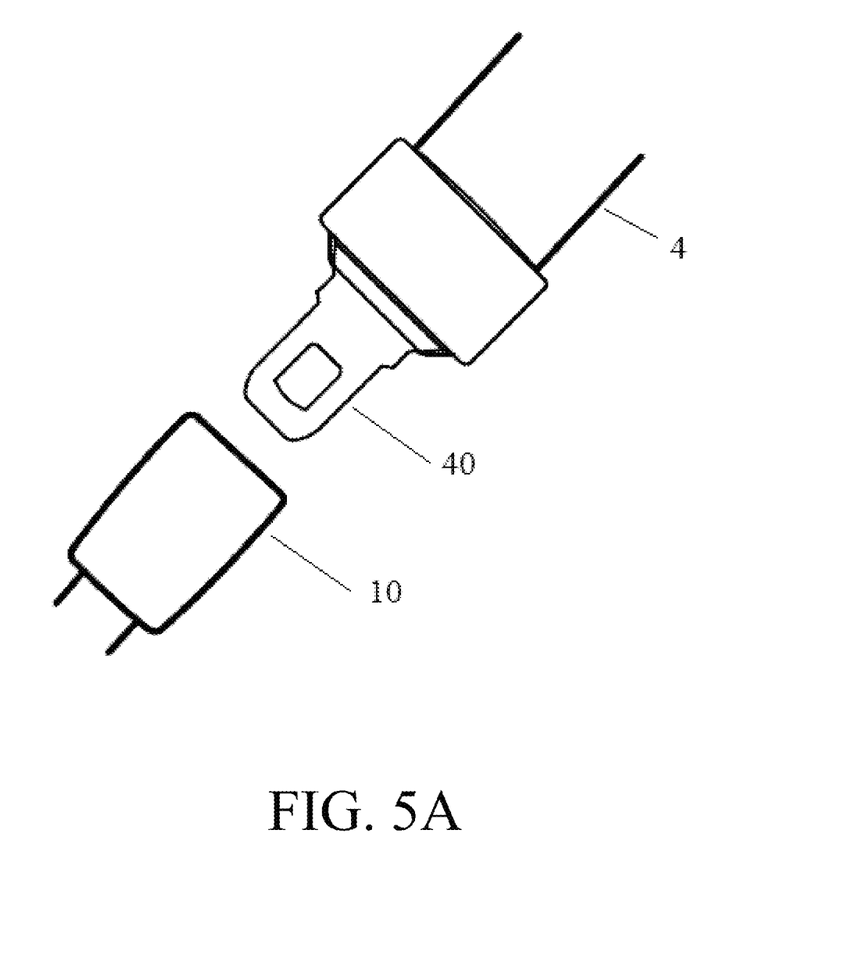
Figure 5B:
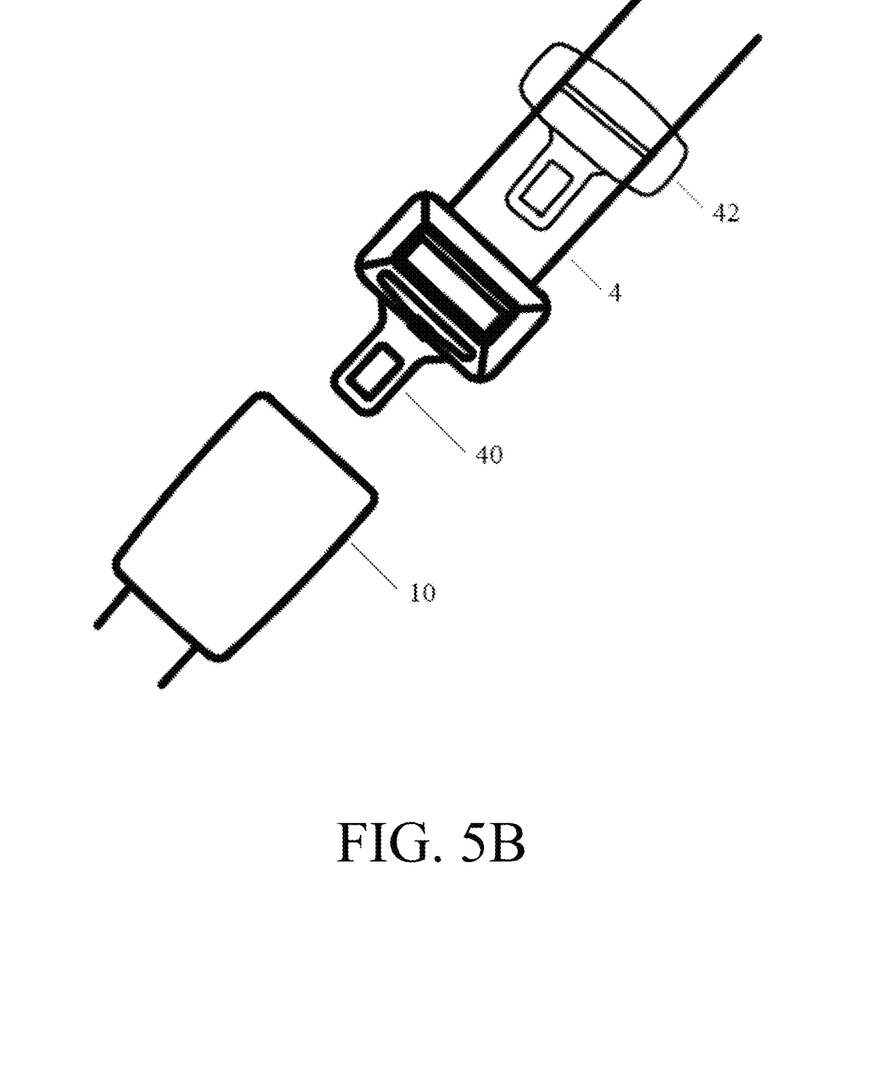
FIG. 5B illustrates an exemplary system utilizing two exemplary metal tongues at exemplary points along a webbing.

Turning now to FIG. 5A, FIG. 5A illustrates an exemplary tongue-shaped metal plate 40 that may be inserted into or otherwise attached to lower anchor point 10, with webbing 4 looping or otherwise passing in, around, or through the metal place 40 housing. FIG. 5B illustrates a similar tongue-shaped metal plate 40 and anchor point 10, and further includes a second tongue-shaped metal plate 42, e.g., an adjustable tongue. Using an adjustable tongue with sufficient strength, such as that shown in FIG. 5B, advantageously allows the lap belt section of the assembly to tightly secure a child restraint system, while also allowing a smaller retractor to be used and placed in the seat back, offering a narrow seat back profile. Aspects of the present invention may utilize an adjustable tongue that may be manually adjusted so that the seat belt functions as a standard 3-point seat belt with the retractor (e.g., an emergency locking-type retractor placed in the upper seat back), while also allowing the lap belt section of the seat belt system to tightly secure a child restraint system.

As should be apparent, the retractors described throughout may comprise, by way of demonstration and not limitation, emergency locking-type retractors which typically lock in response to the rapid deceleration of the vehicle, rapid spooling out of the webbing, or some combination thereof, or automatic locking-type retractors, which typically lock when the continuous motion of spooling the webbing out is stopped, e.g., once the needed webbing is removed from the retractor and placed around the occupant's lap, the retractor automatically locks to prevent further spooling out of webbing.

According to aspects of the present invention, in some embodiments lower anchor point 8 may utilize a retractor, in addition to retractor utilized as described above. For example, the first retractor 16 may be positioned at the first end of the webbing and a second retractor is positioned at the second end of the webbing as lower anchor point 8. This configuration advantageously provides additional webbing to the safety system, since typical safety systems utilize a single retractor, which thereby limits the amount of webbing available for securing larger occupants, child seats, etc.

According to aspects of the present invention, relative placement of seat belt safety system elements or types of deflection points utilized, such as those described throughout, or some combination thereof, advantageously reduces friction of the entire seat belt system and increases comfort and safety. For example, the placement of a retractor as described above reduces the required webbing length, thereby reducing cost and friction, while enabling an optimum webbing path that reduces interference from seat design, reducing the overall complexity of seat design. By placing the first deflection point (relative to the webbing exiting the retractor) close to the retractor and within the seat, overall friction is reduced and the overall appearance of the seat is improved. By positioning the second deflection element (e.g., deflection element 12, above) in the manner described above, the overall friction of the system is again reduced and allows for the proper placement and position of the shoulder belt relative to the height of the current seat occupant. The relative placement of elements also reduces costs of seat frames by permitting one seat frame for both left- and right-type seats.

While the examples given above may indicate individual elements, articles, apparatuses, devices, systems, or some combination thereof for the ease of description, combining, separating, adding, or omitting one or more of the forgoing (or some combination thereof) may be done without departing from the scope of the present invention. Furthermore, aspects of the present invention may be utilized in any appropriate manner or context, such as but not limited to, vehicles (e.g., car, truck, bus, trains, etc.), airlines, shuttles, boats, non-vehicles (e.g., simulators, etc.), or some combination thereof, without departing from the scope of the present invention.

Although the subject matter has been described in language specific to structural features and/or methodological acts, it is to be understood that the subject matter described throughout or defined in the appended claims is not necessarily limited to the specific features or acts described above. Rather, the specific features and acts described above are disclosed as exemplary forms of implementing aspects of the invention.

What is claimed is:

1. A safety system for an occupant in a seat, with the seat having a seat back, with the seat back having a front side and a rear side, and the seat having at least two lower anchor points, each of the at least two anchor points being located on opposite sides of the seat from the other, said system comprising:
   a webbing operative for extending longitudinally across a torso of the occupant of the seat;
   a retractor, said retractor operative for supplying said webbing, maintaining tension on said webbing, and retracting said webbing;
   a first deflection element for deflecting said webbing from said retractor at a first deflection point;
   a second deflection element for said webbing deflected from said first deflection element, said second deflection element having a length along which said webbing deflects at a second deflection point towards the front side of said seat back and towards one of the at least two anchor points, wherein said second deflection point occurs at a variable position along the length of said second deflection element, said variable position of said second deflection point reflecting a height of the occupant;
   wherein said retractor and said first deflection element are positioned in the seat.

2. The system of claim 1, wherein when said webbing extends across the torso of the occupant towards said one of the at least two anchor points, said webbing first contacting the torso of the occupant at a first distance above the seat, causing said webbing to move along said length of said second deflection element to said second deflection point.

3. The system of claim 2, wherein said webbing moving along said length of said second deflection element causes said first deflection element to rotate.

4. The system of claim 3, said retractor being rotatably fixed at its location, such that said retractor rotates about a fixed point as said first deflection element rotates as said webbing moves along said length of second deflection element.

5. The system of claim 1, said system further comprising a tongue-shaped metal plate that moves freely along the webbing that is configured to be retained by a locking device at the lower anchor point on a side of the seat opposite said second deflection element.

6. The system of claim 1, said first deflection element being rotatably fixed at its location, such that said first deflection element rotates about a fixed point as said webbing moves along said length of second deflection element.

7. The system of claim 1, wherein said first deflection element comprises at least one of a pillar loop and a D-ring.

8. The system of claim 1, wherein said second deflection element comprises a retaining element having a void disposed therein, said void having a void length and a void height, said void height being greater than a thickness of said webbing to allow said webbing to pass with minimal friction, wherein said void length corresponds to the length of said second deflection element.

9. The system of claim 1, wherein said first deflection element is positioned above said retractor.

10. The system of claim 1, wherein said first deflection element positioned below said retractor.

11. A safety system for an occupant in a seat, with the seat having a seat back, with the seat back having a front side and a rear side, and the seat having at least two lower anchor points, each of the at least two anchor points being located on opposite sides of the seat from the other, said system comprising:
    a webbing operative for extending longitudinally across a torso of the occupant of the seat;
    a retractor, said retractor operative for supplying said webbing, maintaining tension on said webbing, and retracting said webbing;
    a first deflection element for deflecting said webbing from said retractor at a first deflection point;
    a second deflection element for said webbing deflected from said first deflection element, said second deflection element having a length along which said webbing deflects at a second deflection point towards the front side of said seat back and towards one of the at least two anchor points, wherein said second deflection point occurs at a variable position along the length of said second deflection element, said variable position of said second deflection point reflecting a height of the occupant;
    said first deflection element comprising an elongated element having a first end and a second end, said elongated element being positioned in an upper portion of the seat back, wherein said webbing moves along a length of said elongated element as said webbing moves along said length of second deflection element.

12. The system of claim 11, said elongated element being oriented at an angle, with said second end positioned in proximity to said second deflection element and lower in said seat back than said first end, said retractor positioned in a portion of said seat back opposite said second deflection element.

13. The system of claim 11, said elongated element being oriented horizontally, with said second end positioned in proximity to said second deflection element and lower in said seat back than said first end, said retractor positioned in a portion of said seat back opposite said second deflection element.

14. A safety system for an occupant in a seat, with the seat having a seat back, with the seat back having a front side and a rear side, and the seat having at least two lower anchor points, each of the at least two anchor points being located on opposite sides of the seat from the other, said system comprising:
    a webbing operative for extending longitudinally across a torso of the occupant of the seat;
    a retractor, said retractor operative for supplying said webbing, maintaining tension on said webbing, and retracting said webbing;
    a first deflection element for deflecting said webbing from said retractor at a first deflection point;
    a second deflection element for said webbing deflected from said first deflection element, said second deflection element having a length along which said webbing deflects at a second deflection point towards the front side of said seat back and towards one of the at least two anchor points, wherein said second deflection point occurs at a variable position along the length of said second deflection element, said variable position of said second deflection point reflecting a height of the occupant,
    wherein said second deflection element consists of at least a retaining structure affixed to the seat and a void in the seat, said void having a void length and a void height, said void height being greater than a thickness of said webbing to allow said webbing to pass within said void.

15. A safety system for an occupant in a seat, with the seat having a seat back, with the seat back having a front side and a rear side, and the seat having at least two lower anchor points, each of the at least two anchor points being located on opposite sides of the seat from the other, said system comprising:
- a webbing operative for extending longitudinally across a torso of the occupant of the seat;
- a retractor, said retractor operative for supplying said webbing, maintaining tension on said webbing, and retracting said webbing;
- a first tongue-shaped metal plate that is inserted into a locking device at the lower anchor point on the side of the seat opposite a deflection element; and
- a lockable lap belt section for securing a child restraint system.

16. The system of claim 15 further comprising a second tongue-shaped metal plate, said second metal plate being of an adjustable type, said second metal plate positioned along said webbing, whereby said second metal plate is held in position along said webbing by friction, wherein said second metal plate remains in position along said webbing to tightly secure the child restraint system in place when a deceleration event occurs and the child restraint system moves forward.

17. A safety system for an occupant in a seat, with the seat having a seat back, with the seat back having a front side and a rear side, and the seat having at least two lower anchor points, each of the at least two anchor points being located on opposite sides of the seat from the other, said system comprising:
- a webbing operative for extending longitudinally across a torso of the occupant of the seat, said webbing having a first end and a second end;
- a first retractor and a second retractor, said first retractor and said second retractor operative for supplying said webbing, maintaining tension on said webbing, and retracting said webbing, said first retractor positioned at said first end and said second retractor positioned at said second end, said first retractor being located in the seat.

18. The system of claim 17, said first retractor being an emergency locking-type retractor, said second retractor being an emergency locking-type retractor.

19. The system of claim 17, wherein said first retractor being an emergency locking-type retractor, said second retractor being an automatic locking-type retractor.

* * * * *